(12) United States Patent
Sakaguchi

(10) Patent No.: US 12,186,821 B2
(45) Date of Patent: Jan. 7, 2025

(54) ELECTRIC DISCHARGE MACHINE AND SENSOR UNIT

(71) Applicant: Sodick Co., Ltd., Kanagawa (JP)

(72) Inventor: Masashi Sakaguchi, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 800 days.

(21) Appl. No.: 17/352,351

(22) Filed: Jun. 20, 2021

(65) Prior Publication Data

US 2022/0001474 A1 Jan. 6, 2022

(30) Foreign Application Priority Data

Jul. 6, 2020 (JP) .................................. 2020-116424

(51) Int. Cl.
*B23H 7/32* (2006.01)
*G01B 5/00* (2006.01)
*G01D 5/20* (2006.01)
*G01D 5/34* (2006.01)

(52) U.S. Cl.
CPC ............ *B23H 7/32* (2013.01); *G01B 5/0014* (2013.01); *G01D 5/20* (2013.01); *G01D 5/34* (2013.01); *B23H 2500/20* (2013.01)

(58) Field of Classification Search
CPC ........ B23H 7/32; B23H 2500/20; B23H 7/02; B23H 11/00; B23H 7/10; G01D 5/20; G01D 5/34; G01D 5/24442; G01D 5/34753; G01B 5/00; G01B 5/0014
See application file for complete search history.

(56) References Cited

U.S. PATENT DOCUMENTS

| | | | |
|---|---|---|---|
| 5,523,953 A | 6/1996 | Araie et al. | |
| 7,191,541 B1 * | 3/2007 | Weekers | G01B 5/0014 33/503 |
| 9,664,629 B2 * | 5/2017 | Sakai | G01B 5/0014 |
| 9,776,268 B2 * | 10/2017 | Hamada | B23H 11/00 |
| 9,849,529 B2 * | 12/2017 | Yoshizaki | B23H 7/02 |
| 2013/0227850 A1 * | 9/2013 | Singh | G01B 5/0014 33/502 |
| 2017/0087656 A1 * | 3/2017 | Hasegawa | B23H 7/02 |

FOREIGN PATENT DOCUMENTS

| | | |
|---|---|---|
| JP | S62176735 | 8/1987 |
| JP | H01205917 | 8/1989 |
| JP | H 1177473 A * | 3/1993 |
| JP | H0775937 | 3/1995 |
| JP | 2559789 | 12/1996 |
| JP | 5870143 | 2/2016 |
| JP | 5922995 | 5/2016 |

* cited by examiner

*Primary Examiner* — John J Norton
*Assistant Examiner* — Franklin Jefferson Wang
(74) *Attorney, Agent, or Firm* — JCIPRNET

(57) ABSTRACT

An electric discharge machine is provided. The electric discharge machine includes: an axis drive part moving a tool electrode in at least one axial direction; and a sensor unit detecting a linear movement position of the axis drive part in the axial direction. The sensor unit includes a measurement scale having a linear shape, a position detector scanning the measurement scale and obtaining position information, and a pair of adjustment blocks fixed to both ends of the measurement scale or the position detector and erected perpendicular to an extension direction of the measurement scale. The adjustment blocks are fixed to the axis drive part and are curved in the axial direction due to a temperature change.

5 Claims, 12 Drawing Sheets

ELECTRIC DISCHARGE MACHINE AND SENSOR UNIT

CROSS-REFERENCE TO RELATED APPLICATION

This application claims the priority benefit of Japan application serial no. 2020-116424, filed on Jul. 6, 2020. The entirety of the above-mentioned patent application is hereby incorporated by reference herein and made a part of this specification.

BACKGROUND

Technical Field

The disclosure relates to an electric discharge machine that machines a workpiece using a tool electrode and to a sensor unit that has an adjustment block.

Related Art

Conventionally, there is known an electric discharge machine that machines a workpiece using a tool electrode. Since the electric discharge machine performs machining by using an electric discharge phenomenon between the workpiece and the tool electrode, the electric discharge machine is able to perform precision machining on a high hardness material such as hard metal or ceramics that is difficult to cut off by cutting.

In recent years, high hardness materials have been used in various components such as dies from the viewpoint of improving durability, and the electric discharge machine has been required to achieve a high level of machining accuracy.

Electric discharge machining mainly includes wire electric discharge machining in which a wire of tungsten, brass or the like is used as a tool electrode and cutout is performed by the electric discharge phenomenon between the tool electrode and a workpiece, and die-sinking electric discharge machining in which a tool electrode has a shape into which a workpiece is desired to be machined, and the shape of the tool electrode is transferred to the workpiece by the electric discharge phenomenon between the tool electrode and the workpiece to form the machining shape. Furthermore, in die-sinking electric discharge machining, at least one of the tool electrode and the workpiece is moved mainly in a Z-axis direction. Alternatively, at least one of the tool electrode and the workpiece may be orbited with respect to the other in an XY plane perpendicular to the Z-axis direction.

In such an electric discharge machine, when the temperature of the machine rises or falls due to heat generation or a change in the temperature of the external environment, since a component expands or contracts due to the temperature change, machine accuracy or machining accuracy may be adversely affected. Specifically, an axis drive part for moving the tool electrode or the workpiece is made of a metal such as cast iron due to manufacturing restrictions. Hence, when the temperature of the axis drive part changes due to heat generation or a change in the temperature of the external environment, the axis drive part may expand or contract and be thermally deformed. As a result, a problem may arise that the tool electrode is misaligned and positioning accuracy or machining accuracy is reduced.

Therefore, conventionally, in order to prevent misalignment of a tool electrode caused by thermal displacement of a component, thermal displacement correction (see Patent Documents 1 to 3) is performed in which a thermal displacement amount of the tool electrode is calculated based on a temperature detected by a temperature sensor installed on each part of the machine and a movement amount is corrected. In addition, alignment setting before machining is performed, an error due to a gap change generated during electric discharge machining or a machining depth error is detected and diagnosed, and correction is performed (see Patent Document 4).

PATENT DOCUMENTS

[Patent Document 1] Japanese Patent Laid-open No. S62-176735
[Patent Document 2] Japanese Patent Laid-open No. H07-075937
[Patent Document 3] Japanese Patent No. 5870143
[Patent Document 4] Japanese Patent No. 2559789

However, in the method using the temperature sensor as described in Patent Documents 1 to 3, an additional cost of purchasing multiple sensors for temperature detection may be incurred. In addition, when the temperature of a machine body cannot be accurately measured in real time, a time lag may occur in a correction value and an error may occur in correction.

In addition, in the machining error detection method in Patent Document 4, in order to perform alignment before machining, calculate a thermal expansion deformation error generated during machining and derive a correction value, an alignment operation needs to be performed in advance and calculation processing may become complex.

Therefore, the disclosure provides an electric discharge machine and a sensor unit, in which a relative misalignment of a tool electrode due to thermal displacement of a component (particularly, an axis drive part) is able to be accurately corrected with a simple configuration and without performing complex control.

SUMMARY

An electric discharge machine of the disclosure includes: an axis drive part, configured to move a tool electrode in at least one axial direction; and a sensor unit, configured to detect a linear movement position of the axis drive part in the at least one axial direction. The sensor unit includes: a measurement scale, having a linear shape; a position detector, configured to scan the measurement scale and obtain position information; and a pair of adjustment blocks, being fixed to both ends of the measurement scale or the position detector and erected perpendicular to an extension direction of the measurement scale. Each of the pair of adjustment blocks is fixed to the axis drive part and is curved in the at least one axial direction due to a temperature change.

A sensor unit of the disclosure includes: a measurement scale, having a linear shape; a position detector, configured to scan the measurement scale and detect a linear movement position of an object to be measured; and a pair of adjustment blocks, being fixed to both ends of the measurement scale or the position detector and erected perpendicular to an extension direction of the measurement scale. Each of the adjustment blocks includes a first block and a second block made of different materials, is fixed to the object to be measured and is curved due to a temperature change.

DESCRIPTION OF THE EMBODIMENTS

Figure 1:
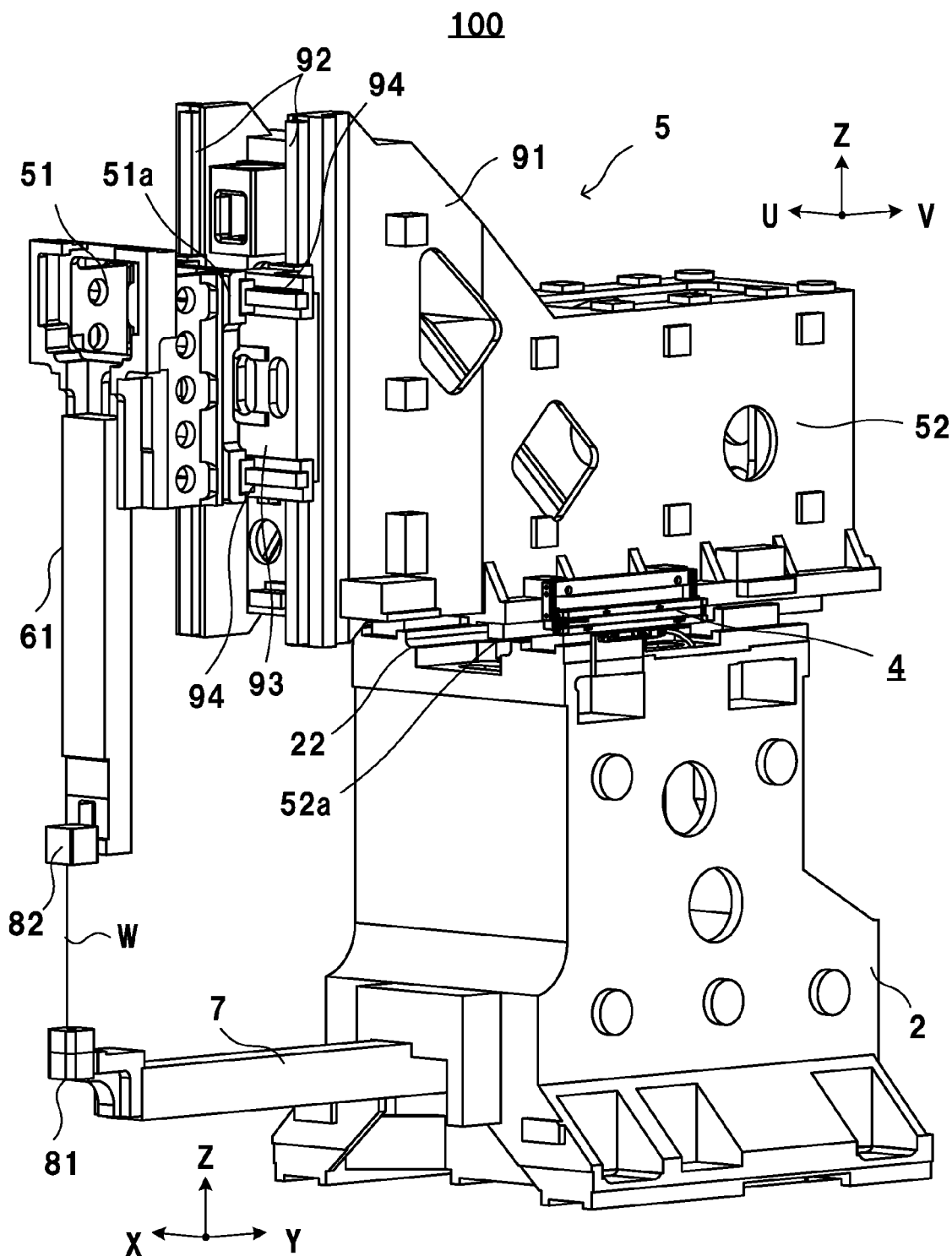
FIG. 1 is a perspective view showing an outline of a wire electric discharge machine 100 according to an embodiment of the disclosure.

An electric discharge machine of the disclosure includes: an axis drive part, configured to move a tool electrode in at least one axial direction; and a sensor unit, configured to detect a linear movement position of the axis drive part in the at least one axial direction. The sensor unit includes: a measurement scale, having a linear shape; a position detector, configured to scan the measurement scale and obtain position information; and a pair of adjustment blocks, being fixed to both ends of the measurement scale or the position detector and erected perpendicular to an extension direction of the measurement scale. Each of the pair of adjustment blocks is fixed to the axis drive part and is curved in the at least one axial direction due to a temperature change.

In the electric discharge machine of the disclosure, the axis drive part includes: a base; and a moving body, being disposed to face the base and reciprocating in the axial direction. The measurement scale and the position detector are disposed to face each other with one fixed to the base and the other fixed to the moving body.

Furthermore, a sensor unit of the disclosure includes: a measurement scale, having a linear shape; a position detector, configured to scan the measurement scale and detect a linear movement position of an object to be measured; and a pair of adjustment blocks, being fixed to both ends of the measurement scale or the position detector and erected perpendicular to an extension direction of the measurement scale. Each of the adjustment blocks includes a first block and a second block made of different materials, is fixed to the object to be measured and is curved due to a temperature change.

Herein, a "tool electrode" refers to a wire electrode used in a wire electric discharge machine or an electrode used in a die-sinking electric discharge machine.

An "axis drive part" is a drive mechanism for moving the tool electrode in at least one axial direction. For example, the drive mechanism for moving in a V-axis direction includes a column, a V-axis slider, a rail, and a linear guide; the drive mechanism for moving in a Y-axis direction includes a bed or a column; the drive mechanism for moving in a Z-axis direction includes a Z-axis slider, a Z-axis base, a rail, and a linear guide; and the drive mechanism for moving in a U-axis direction includes a U-axis slider, a Z-axis slider, a rail, and a linear guide.

Furthermore, a "base" is a member that supports a moving body and has a rail or the like fixed thereon for reciprocating the moving body. Examples thereof include a table, a column, a Z-axis base, and a Z-axis slider.

A "moving body" is a member that moves in an axial direction relative to the base. Examples thereof include a V-axis slider, a column, a Z-axis slider, and a U-axis slider.

According to the disclosure, the measurement scale or the position detector is fixed to the axis drive part via the adjustment block, and the adjustment block is curved in the axial direction by a thermal displacement amount of the axis drive part when the temperature changes. In this way, the measurement scale or the position detector is able to be automatically moved in the axial direction, and a position misalignment due to thermal displacement is able to be corrected with a simple configuration.

In the electric discharge machine of the disclosure, the adjustment block includes a first block and a second block made of different materials.

In the electric discharge machine of the disclosure, the first block is made of ceramics, and the second block is made of a material having substantially the same coefficient of linear expansion as that of the axis drive part.

Furthermore, in the electric discharge machine of the disclosure, the adjustment block includes: a groove; and a wide part, having a width greater than a width of the groove.

According to the disclosure, since the adjustment block is formed of the first block and the second block made of different materials, due to a difference in coefficient of thermal expansion between the first block and the second block, an internal stress is generated on a fastening surface when the temperature changes, and the adjustment block is curved due to a bimetal effect. By using the bimetal effect, a deviation of relative position of the axis drive part caused by a temperature change is able to be corrected with a simple configuration.

It is possible to adjust the amount of curving of the adjustment block by changing the materials of the first block and the second block. Preferably, the first block is made of ceramics, and the second block is made of a material having substantially the same coefficient of linear expansion as that of the axis drive part.

It is also possible to adjust the amount of curving of the adjustment block by changing the shape of the adjustment block. For example, in the case where the adjustment block includes the groove and the wide part having a width greater than the width of the groove, the amount of curving of the adjustment block is able to be easily adjusted by changing a difference between the width of the groove and the width of the wide part.

In the disclosure, simply by fixing the sensor unit to the axis drive part via the adjustment block, there is no need to perform a complex misalignment correction such as software control. Hence, it is possible to, easily and at low cost, correct a deviation of relative position of the axis drive part caused by a temperature change, and provide an electric discharge machine and a sensor unit with high accuracy.

(1.1. Overall Configuration of Wire Electric Discharge Machine 100)

Hereinafter, an embodiment of the disclosure is described in detail with reference to the drawings. FIG. 1 is a perspective view showing an outline of a wire electric discharge machine 100 according to an embodiment of the disclosure.

Although the disclosure may be applied to a wire electric discharge machine and a die-sinking electric discharge machine, in the embodiment described hereinafter, the wire electric discharge machine will be described as an example.

In addition, in the following description, in a machine body of the wire electric discharge machine 100, a surface (a surface shown when the machine body is viewed from a negative direction of the Y-axis on the sheet of FIG. 1) on a side where a vertical arm 61 is provided on a U-axis slider 51 is taken as a front surface. A surface on the rear side when facing the front surface is taken as a back surface; surfaces on the right-hand side and the left-hand side when facing the front surface are taken as side surfaces. In the case of viewing the machine body from the upper side when facing the front surface, a surface shown is taken as an upper surface; in the case of viewing the machine body from the lower side when facing the front surface, a surface shown is taken as a bottom surface.

The wire electric discharge machine 100 includes a bed (not shown) mounted on an installation surface, a column 2 installed on the bed to be reciprocally movable in a Y-axis direction being a horizontal direction, a V-axis slider 52 horizontally installed on the column 2 to be reciprocally movable in a horizontal uniaxial direction (V-axis direction) parallel to the Y-axis direction, a Z-axis base 91 provided at one end of the V-axis slider 52, a Z-axis slider 93 attached to the Z-axis base 91 via a linear guide (not shown) to be reciprocally movable in a Z-axis direction, the U-axis slider 51 horizontally installed on a surface of the Z-axis slider 93 facing the Z-axis base 91 via a linear guide 51*a* to be reciprocally movable in a horizontal uniaxial direction (U-axis direction) parallel to the X-axis direction, the vertical arm 61 fixed to the U-axis slider 51 from the front surface side, and a sensor unit 4 fixed to an approximately central position H of the V-axis slider 52 in the V-axis direction.

An upper guide unit 82 is fixed to a lower end of the vertical arm 61. A lower support 7 extending from the column 2 is fixed to a lower sidewall of the column 2, and a lower guide unit 81 is fixed to one end of the lower support 7.

Below the lower guide unit 81, a table (not shown) installed to be movable in a direction (X-axis direction) perpendicular to the Y-axis direction is provided. A machining tank (not shown) is attached on the table, and a workpiece may be mounted on a work stand inside the machining tank.

Multiple rails 22 extending in the V-axis direction are fixed to an upper part of the column 2. The rails 22 are engaged with multiple linear guides 52*a* fixed to a bottom of the V-axis slider 52. Accordingly, the V-axis slider 52 is linearly movable in the V-axis direction.

The Z-axis base 91 is integrally fixed to one end of the V-axis slider 52.

Multiple rails 92 extending in the Z-axis direction are fixed to a front surface of the Z-axis base 91. The rails 92 are engaged with multiple linear guides (not shown) provided on the Z-axis slider 93. Accordingly, the Z-axis slider 93 is linearly movable in the vertical direction (that is, the Z-axis direction) with respect to the Z-axis base 91.

Multiple rails 94 extending in the U-axis direction are fixed to a front surface of the Z-axis slider 93. The rails 94 are engaged with multiple linear guides 51*a* provided on the U-axis slider 51. Accordingly, the U-axis slider 51 is linearly movable in the U-axis direction with respect to the Z-axis slider 93.

Known linear guides may be appropriately used as the linear guides 51*a* and 52*a* and the linear guides provided on the Z-axis slider 93. By the linear guides 51*a* and 52*a* and the linear guides provided on the Z-axis slider 93, the column 2, the U-axis slider 51, the V-axis slider 52, the Z-axis slider 93 and the table are reciprocated in each direction by a drive member such as a motor.

An axis drive part 5, such as the column 2, the V-axis slider 52, the U-axis slider 51, and the Z-axis slider 93, is made of cast iron being a material having a larger coefficient of linear expansion than ceramics, due to manufacturing restrictions.

The vertical arm 61 is a member having a long prismatic shape, and the upper guide unit 82 made of stainless steel is provided at the lower end of the vertical arm 61. The vertical arm 61 is provided perpendicular to an XY plane and is made of ceramics being a material that is hardly deformed by heat and has high rigidity.

The lower support 7 is a member fixed to a front lower part of the column 2 and having a prismatic shape or columnar shape extending from the column 2. The lower guide unit 81 is fixed to a tip of the lower support 7. The lower support 7 is made of ceramics, and the lower guide unit 81 is made of stainless steel being a material having a larger coefficient of linear expansion than cast iron.

In the wire electric discharge machine 100, while a machining voltage is supplied to the workpiece and a wire electrode W from a power supply apparatus for electric discharge machining (not shown), the workpiece mounted on the work stand is relatively moved along a desired path with respect to the wire electrode W bridged between the upper guide unit 82 and the lower guide unit 81 by a control apparatus (not shown), and electric discharge machining is able to be performed.

(1.2. Configuration of Sensor Unit 4)

Figure 2:
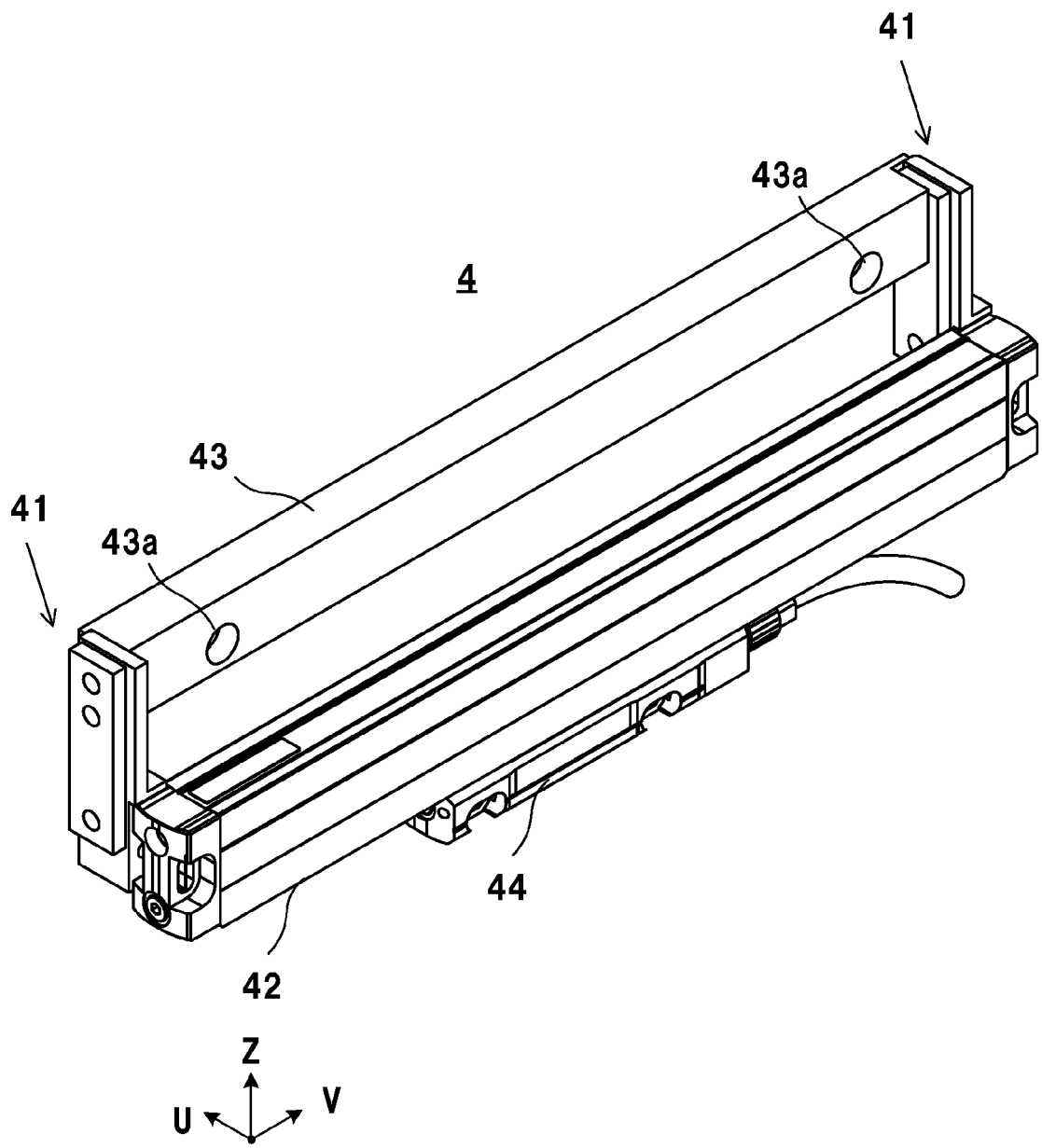
FIG. 2 is a perspective view showing an implementation of a sensor unit 4 of the above embodiment.
Figure 3:
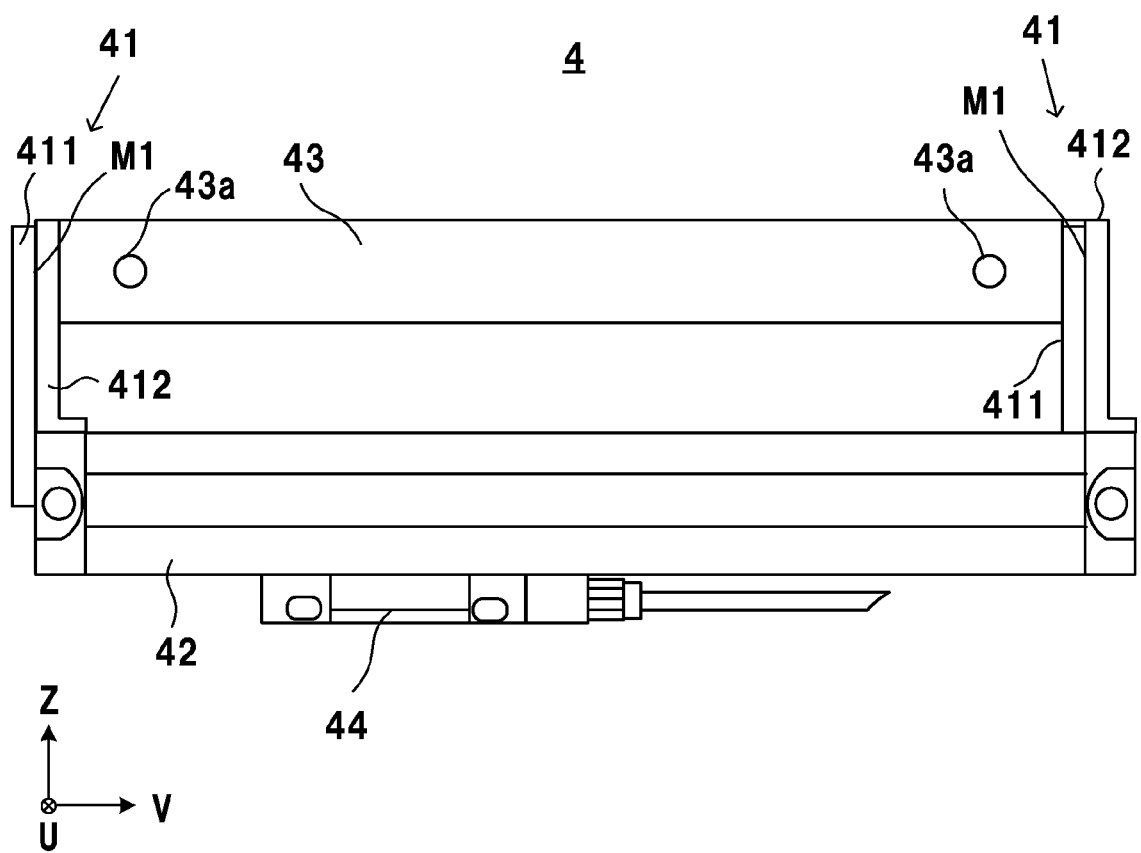
FIG. 3 is a side view showing an implementation of the sensor unit 4 of the above embodiment.
Figure 4:
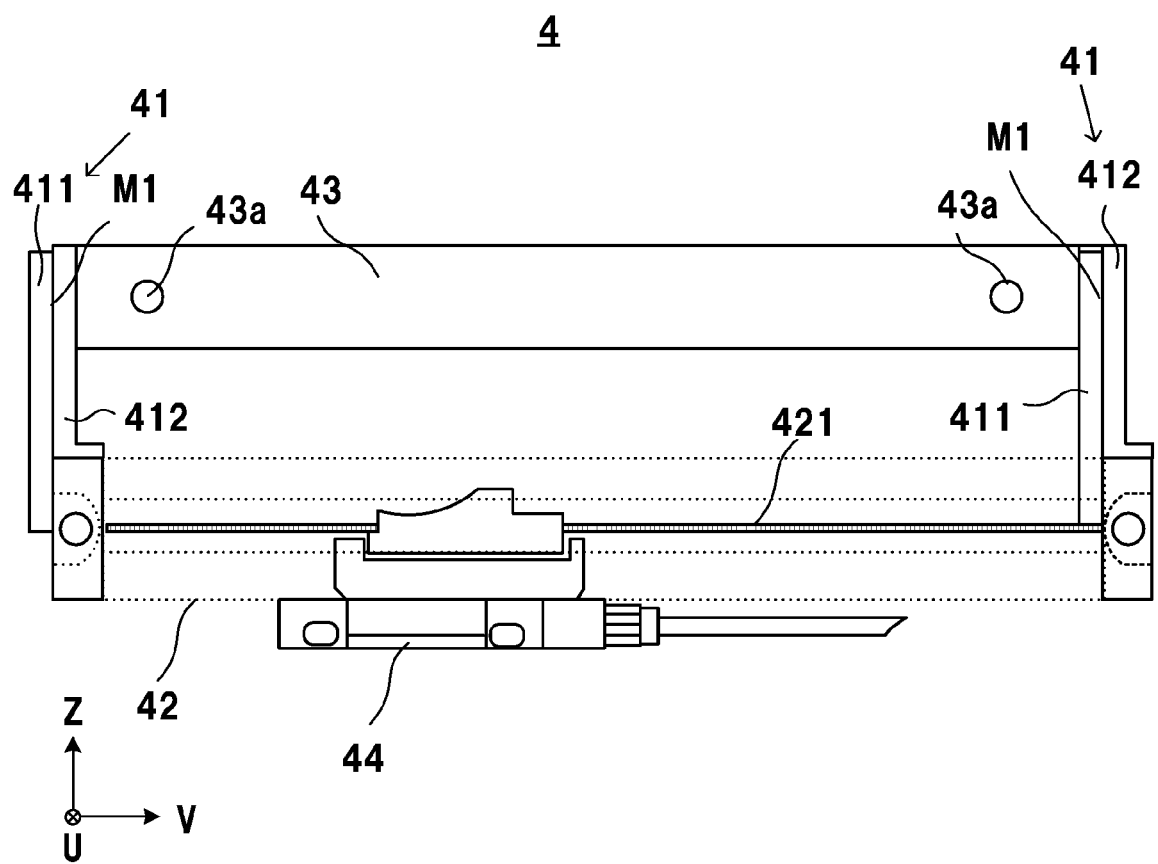
FIG. 4 is a schematic view showing an internal structure of the sensor unit 4 of the above embodiment.
Figure 5:
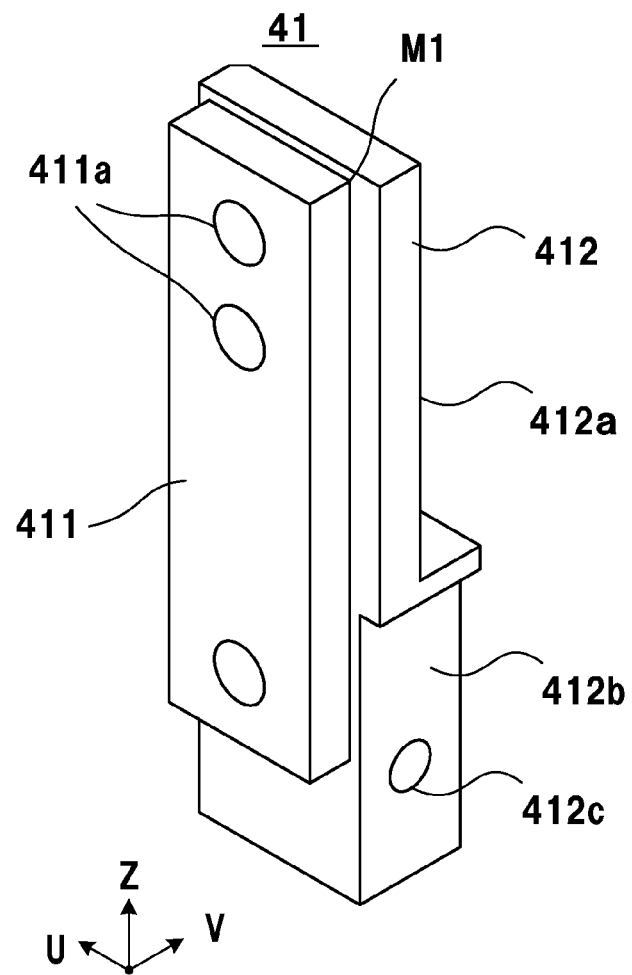
FIG. 5 is a perspective view showing an adjustment block 41 of the sensor unit 4 of the above embodiment.
Figure 6:
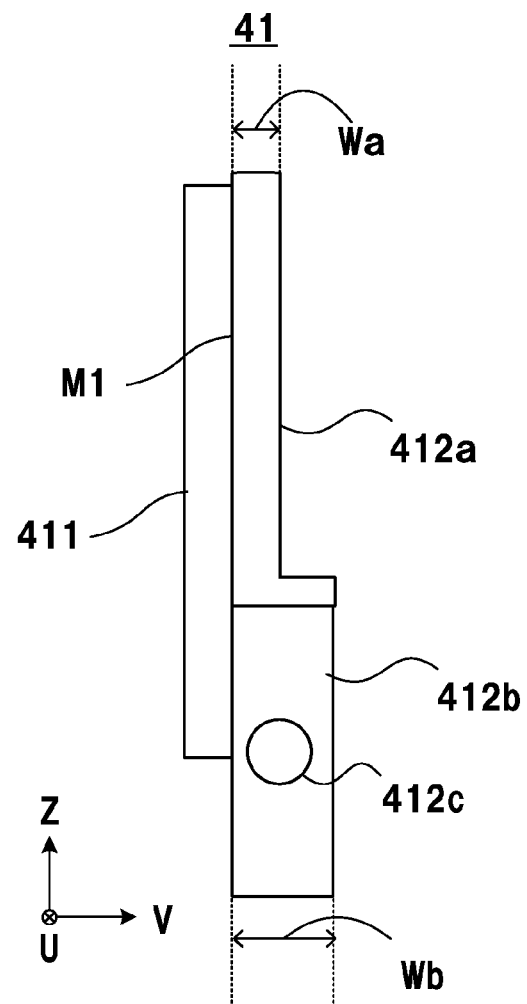
FIG. 6 is a side view showing the adjustment block 41 of the sensor unit 4 of the above embodiment.
Figure 10:
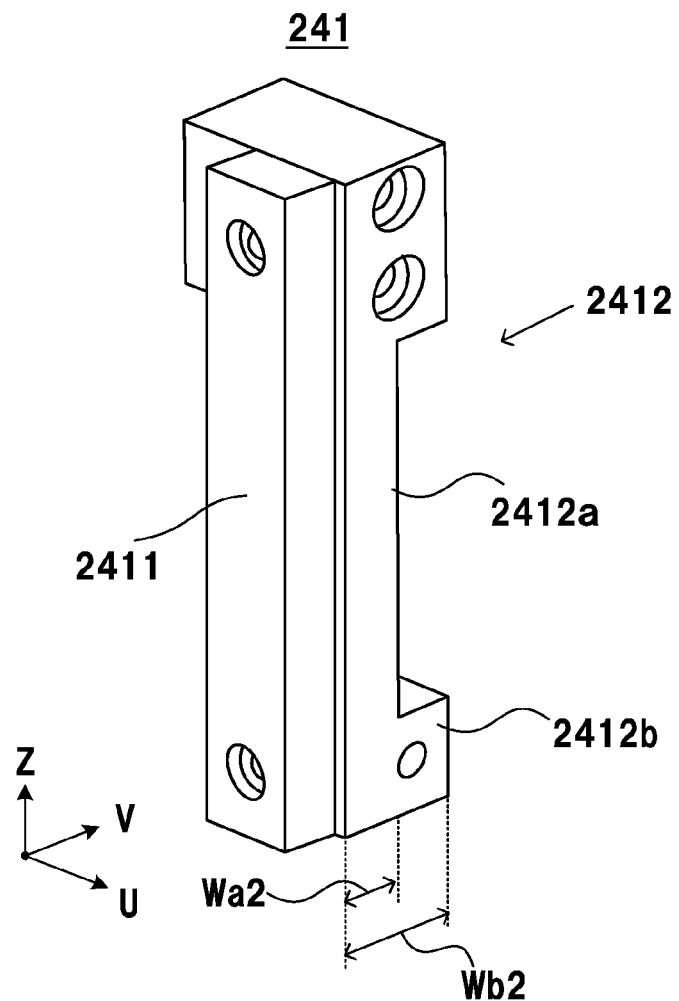
FIG. 10 is a perspective view showing another example (241) of the adjustment block 41 of the sensor unit 4 of the above embodiment.

FIG. 2 is a perspective view showing an implementation of the sensor unit 4 of the above embodiment. FIG. 3 is a side view showing an implementation of the sensor unit 4 of the above embodiment. FIG. 4 is a schematic view showing an internal structure of the sensor unit 4 of the above embodiment. FIG. 5 is a perspective view showing an adjustment block 41 of the sensor unit 4 of the above embodiment. FIG. 6 is a side view showing the adjustment block 41 of the sensor unit 4 of the above embodiment. FIG. 10 is a perspective view showing another example (241) of the adjustment block 41 of the sensor unit 4 of the above embodiment. Here, a part of the configuration such as bolts used in the sensor unit 4 is omitted from the drawings for convenience.

The sensor unit 4 of the disclosure is a detector that detects a linear movement position of the upper guide unit 82 in the V-axis direction. The sensor unit 4 includes a measurement scale 421 having a linear shape, a housing 42 housing the measurement scale 421, a position detector 44 scanning the measurement scale 421 and obtaining position information, a pair of adjustment blocks 41, 41 fixed to both ends of the measurement scale 421 and erected perpendicular to an extension direction of the measurement scale 421, and a fixing member 43 for fixing the adjustment block 41 to the V-axis slider 52.

In the wire electric discharge machine 100, during electric discharge machining, the upper guide unit 82 is moved according to its position in the V-axis direction as detected by the sensor unit 4.

In the measurement scale 421, the housing 42 and the position detector 44, a known linear encoder is used. Any linear encoder of a type that reads the measurement scale 421 is applicable regardless of whether it is of an incremental type, an absolute type, an optical type, a magnetic type, or an inductive type.

For example, the measurement scale 421 having a linear shape, in which a pattern made of light-shielding chrome is provided on a transparent linear platelike member, is housed in the housing 42. The pattern is scanned by the position detector 44 in which a light source and a large number of photodetectors are provided. Light from the light source of the position detector 44 passes through a transparent region of the pattern and reaches the photodetectors. By processing an electric signal output from the photodetectors by an electronic circuit (not shown), the position information is obtained, and the linear movement position of the upper guide unit 82 in the V-axis direction is detected.

The housing 42 has a rectangular shape, and the measurement scale 421 is provided along a longitudinal direction in a central position inside the housing 42 (see FIG. 4). Both ends of the housing 42 are respectively fixed to lower parts of the pair of adjustment blocks 41, 41 erected and fixed perpendicular to the extension direction of the measurement scale 421. Upper parts of the pair of adjustment blocks 41, 41 are fixed to the fixing member 43. By fixing the fixing member 43 to the V-axis slider 52, the measurement scale 421 is fixed to the V-axis slider 52 via the adjustment block 41.

In the present embodiment, the measurement scale 421 is housed in the housing 42. However, if the adjustment blocks 41, 41 are fixed to both ends of the measurement scale 421, the measurement scale 421 does not have to be housed in the housing 42.

The position detector 44 is attached to the upper part of the column 2. Hence, the position detector 44 is able to detect a relative linear movement position in the V-axis direction between the column 2 and the V-axis slider 52.

The adjustment block 41 is a block-like member that causes a misalignment similar to a misalignment of the V-axis slider 52 in the V-axis direction due to thermal displacement. The adjustment block 41 is formed of a first block 411 and a second block 412 made of different materials.

The first block 411 has a flat plate shape or a rectangular parallelepiped shape, and is made of ceramics. In the first block 411, a hole 411a for fixing the fixing member 43 is provided. The second block 412 is fixed to a fastening surface M1 on a back surface of the first block 411.

The second block 412 is a member made of a material having a larger coefficient of linear expansion than the first block 411. Specifically, the second block 412 is made of a metal such as S45C that has substantially the same linear expansion coefficient as that of the V-axis slider 52. The second block 412 is composed of a narrow groove 412a having a width Wa and a wide part 412b having a width Wb greater than the width Wa. The second block 412 has an L shape as a whole in side view. A hole 412c for attaching the housing 42 is provided in a lower part of the second block 412.

The pair of adjustment blocks 41, 41 is provided at both ends of the housing 42 so that the first block 411 is disposed on the front surface side and is perpendicular to the extension direction of the measurement scale 421.

The adjustment block 41 is formed by joining the first block 411 and the second block 412 made of different materials on the fastening surface M1. Hence, when the temperature of the adjustment block 41 changes due to a change in the external environment or the like, an internal stress is generated in the fastening surface M1 due to a difference in coefficient of thermal expansion between the first block 411 and the second block 412, and the adjustment block 41 is curved due to a bimetal effect.

Specifically, ceramics being the material of the first block 411 has a coefficient of linear expansion of about ½ to about ⅓ that of cast iron being the material of the second block 412. Hence, when the temperature rises, compressive and tensile stresses acting parallel to the fastening surface M1 increase, and a force F1 inclined from a vertical direction (perpendicular to the extension direction of the measurement scale 421) is generated in the adjustment block 41. Due to the force F1, the adjustment block 41 is curved in a negative direction of the V-axis (see FIG. 8). When the temperature falls, since a force F2 opposite the force F1 inclined from the vertical direction is generated in the adjustment block 41, the adjustment block 41 is curved in a positive direction of the V-axis due to the force F2 (see FIG. 9).

The adjustment block 41, the first block 411 and the second block 412 may adopt various shapes. For example, in the adjustment block 241 composed of a first block 2411 and a second block 2412, the second block 2412 is composed of a groove 2412a having a small width and a wide part 2412b having a width greater than the width of the groove 2412a, and may have a horizontal-U shape as a whole in side view (see FIG. 10). By adjusting a difference between a width Wa2 of the groove 2412a and a width Wb2 of the wide part 2412b, the amount of curving of the adjustment block 241 due to a temperature change is able to be adjusted.

The fixing member 43 is a member for attaching the housing 42 to the V-axis slider 52, and the pair of adjustment blocks 41, 41 are fixed to both ends of the fixing member 43. Specifically, one end of the fixing member 43 is fixed to a back surface of the adjustment block 41 disposed on the front surface side, and the other end of the fixing member 43 is fixed to a front surface of the adjustment block 41 disposed on the back surface side.

The fixing member 43 has a hole 43a for attachment to the V-axis slider 52, and the housing 42 is attached to a lower part of the V-axis slider 52 by using the hole 43a. In order to accurately measure the linear movement position of the upper guide unit 82 in the V-axis direction, the housing 42 is attached so that the measurement scale 421 extends parallel to the V-axis direction.

In the present embodiment, the adjustment blocks 41, 41 are fixed to the V-axis slider 52 via the fixing member 43. However, the adjustment blocks 41, 41 may also be fixed directly to the V-axis slider 52 without using the fixing member 43.

(1.3 Description of Functions of Adjustment Block 41)

Figure 7:
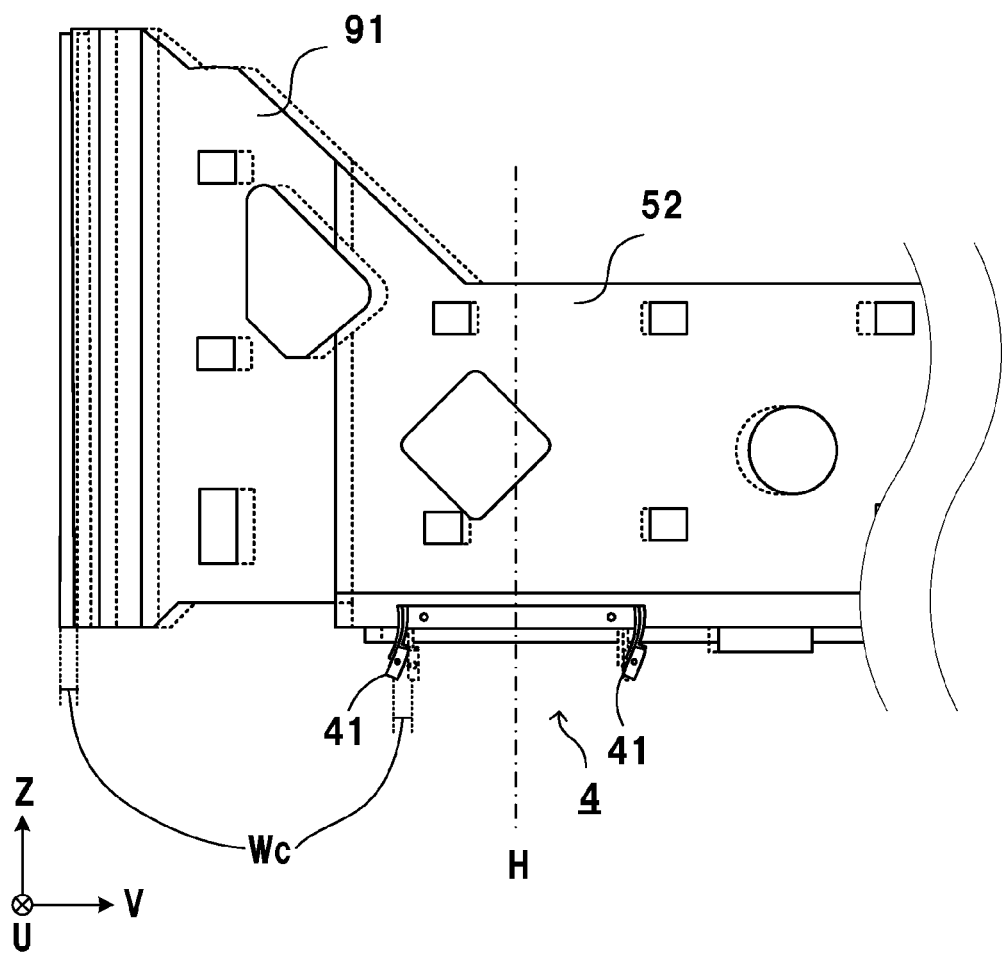
FIG. 7 is an explanatory view showing a displacement of a V-axis slider 52 of the disclosure and a bent state of the adjustment block 41 when the outside air temperature rises.
Figure 8:
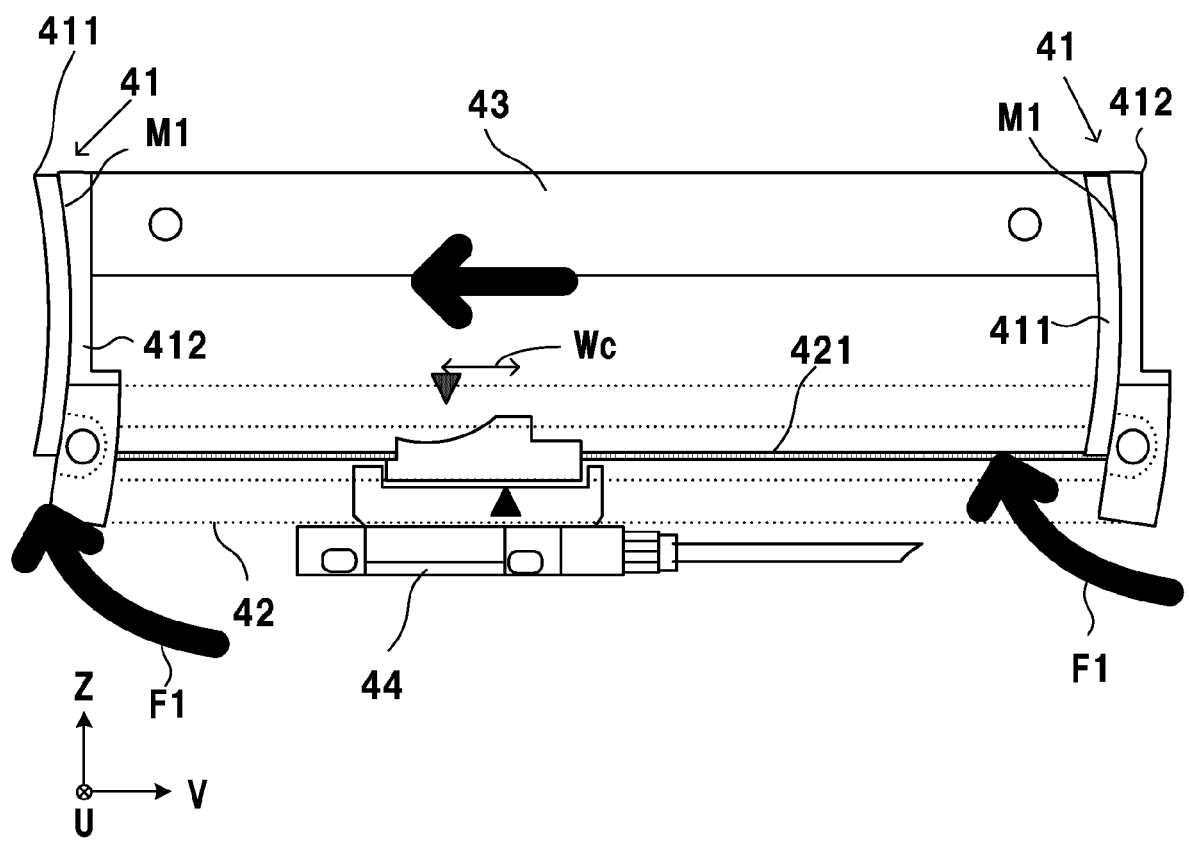
FIG. 8 is a schematic view showing a movement of the sensor unit 4 when a machine temperature of an upper guide unit 82 rises.
Figure 9:
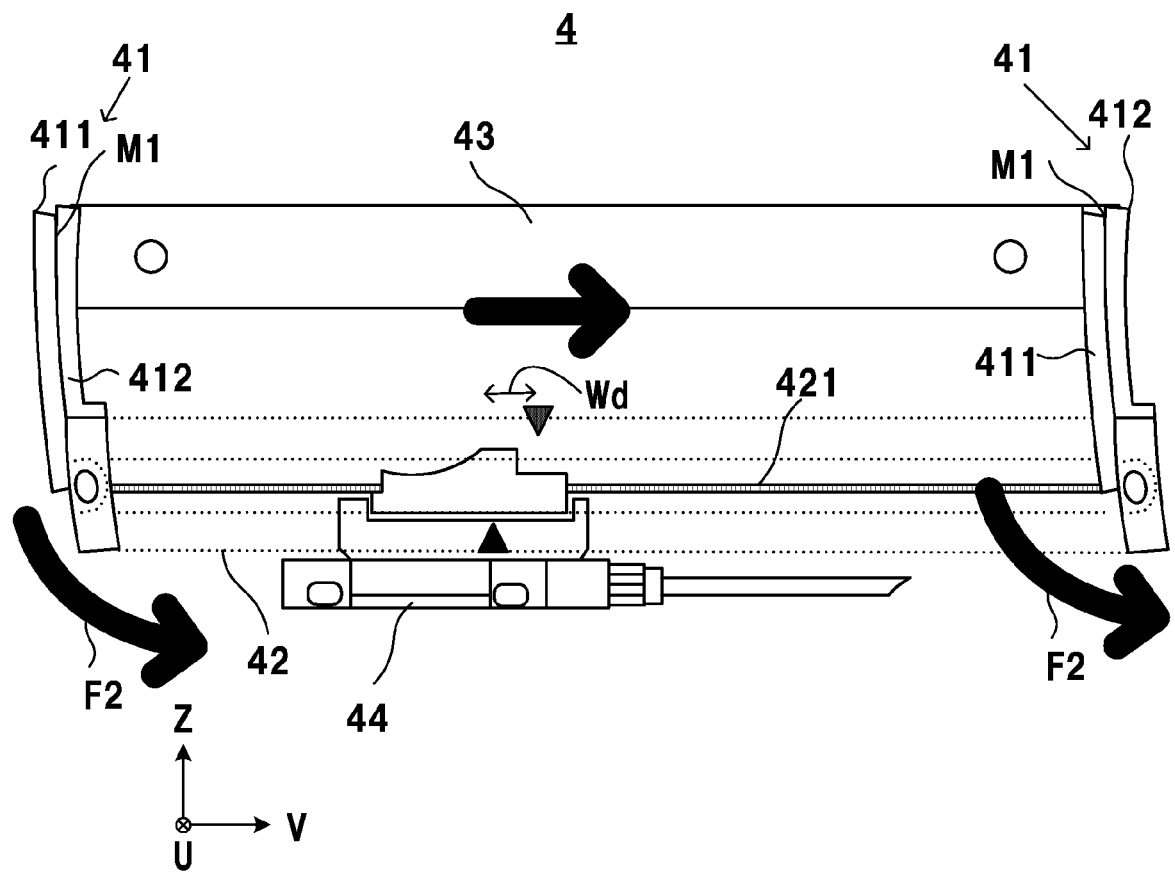
FIG. 9 is a schematic view showing a movement of the sensor unit 4 when the machine temperature of the upper guide unit 82 falls.

FIG. 7 is an explanatory view showing a displacement of the V-axis slider 52 of the disclosure and a bent state of the adjustment block 41 when the outside air temperature rises. FIG. 8 is a schematic view showing a movement of the sensor unit 4 when a machine temperature of the upper guide unit 82 rises. FIG. 9 is a schematic view showing a movement of the sensor unit 4 when the machine temperature of the upper guide unit 82 falls.

In the wire electric discharge machine 100, the V-axis slider 52 being the axis drive part 5 is made of cast iron being a material having a large coefficient of linear expansion. Hence, when the temperature of the V-axis slider 52 changes due to a change in the external environment, the V-axis slider 52 expands and contracts, and the upper guide unit 82 may shift in the V-axis direction (see FIG. 1 and FIG. 7).

Specifically, when the temperature of the V-axis slider 52 rises, with the approximately central position H as a reference, the front surface side of the V-axis slider 52 expands in the negative direction of the V-axis, and the upper guide unit 82 is displaced in the negative direction of the V-axis. When the temperature of the V-axis slider 52 falls, the front surface side of the V-axis slider 52 contracts in the positive direction of the V-axis, and the upper guide unit 82 is displaced in the positive direction of the V-axis.

In this way, when the V-axis slider 52 expands and contracts due to a change in the outside air temperature or the like, the upper guide unit 82 shifts in the V-axis direction, and the machining accuracy of a workpiece is adversely affected.

Therefore, in the disclosure, by fixing the measurement scale 421 to the V-axis slider 52 via the adjustment block 41, the measurement scale 421 is moved in the V-axis direction by the same amount as a displacement amount We of the V-axis slider 52 in the V-axis direction.

Specifically, the adjustment block 41 is formed so as to be curved in the positive direction of the V-axis or the negative direction of the V-axis due to a temperature change. The measurement scale 421 is displaced in the V-axis direction due to curving of the pair of adjustment blocks 41, 41 disposed at both ends (see FIG. 8 and FIG. 9).

Sizes or the like of the first block 411 and the second block 412 are adjusted so that a displacement amount of the measurement scale 421 that moves in the V-axis direction due to a temperature change is the same as the displacement amount of the V-axis slider 52 that is displaced in the V-axis direction due to a temperature change.

For example, when a machine temperature of the wire electric discharge machine 100 rises by Tc degrees, it is assumed that the front surface side of the V-axis slider 52 is displaced in the negative direction of the V-axis by the displacement amount We (see FIG. 7). In that case, the adjustment block 41 is curved in the negative direction of the V-axis when the temperature rises by Tc degrees, and the measurement scale 421 is accordingly moved in the negative direction of the V-axis by the same amount as the displacement amount We (see FIG. 8).

When the machine temperature of the wire electric discharge machine 100 falls by Td degrees, it is assumed that the front surface side of the V-axis slider 52 is displaced in the positive direction of the V-axis by a displacement amount Wd. In that case, when the temperature falls by Td degrees, the adjustment block 41 is similarly curved in the positive direction of the V-axis, and the measurement scale 421 is accordingly moved in the positive direction of the V-axis by the same amount as the displacement amount Wd (see FIG. 9).

In the wire electric discharge machine 100, during electric discharge machining, the upper guide unit 82 is moved and controlled in the V-axis direction by using the position information actually measured by the sensor unit 4. At that time, in the wire electric discharge machine 100, since the upper guide unit 82 is driven by using the measurement scale 421 displaced by We or Wd in advance, it is possible to correct a misalignment of the upper guide unit 82 due to a temperature change without performing complex software control.

(1.4 Displacement Amount of Adjustment Block 41)

Figure 12:
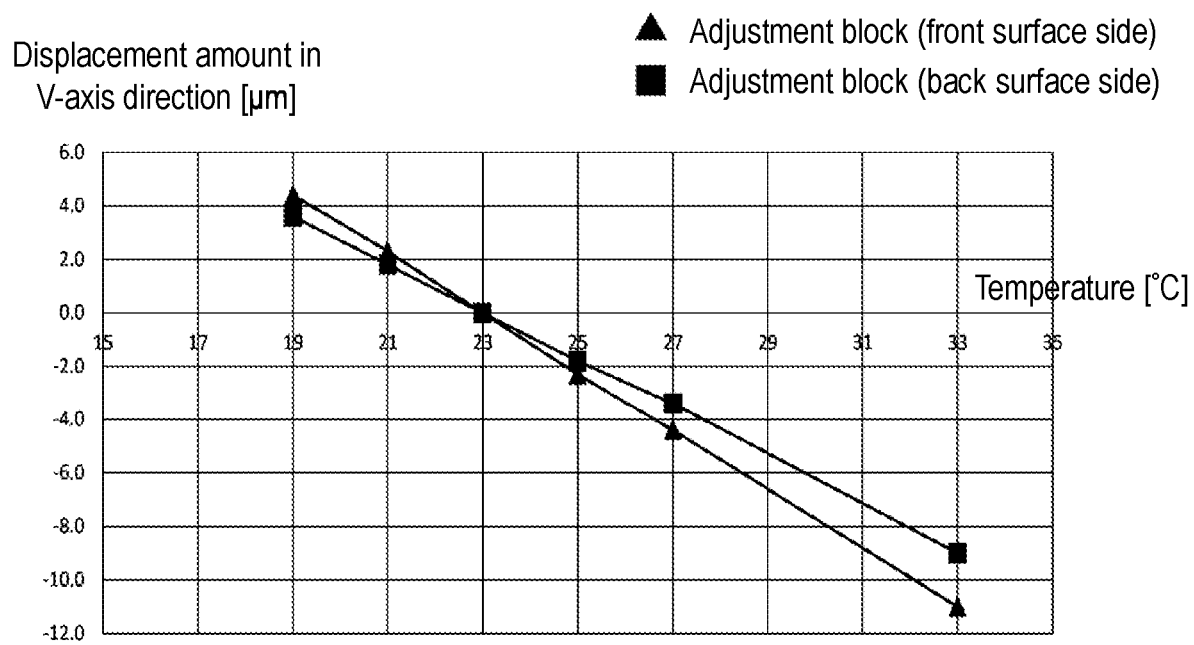
FIG. 12 is a graph showing a displacement amount [μm] of the adjustment block 41 in a V-axis direction due to a temperature change [° C.] of the above embodiment.

FIG. 12 is a graph showing a displacement amount [μm] of the adjustment block 41 in the V-axis direction in a measurement scale fixing position when the temperature of the adjustment block 41 changes, with the case where the temperature of the adjustment block 41 is 23° C. as a reference. Here, a graph in which triangular markers are connected with lines shows the displacement of the adjustment block 41 disposed on the front surface side, and a graph in which square markers are connected with lines shows the displacement of the adjustment block 41 disposed on the back surface side.

As shown in the graph of FIG. 12, when the temperature rises above the reference temperature of 23° C., the fixing position of the measurement scale 421 is displaced in the negative direction of the V-axis; when the temperature falls below 23° C., the fixing position of the measurement scale 421 is displaced in the positive direction of the V-axis.

Figure 11:
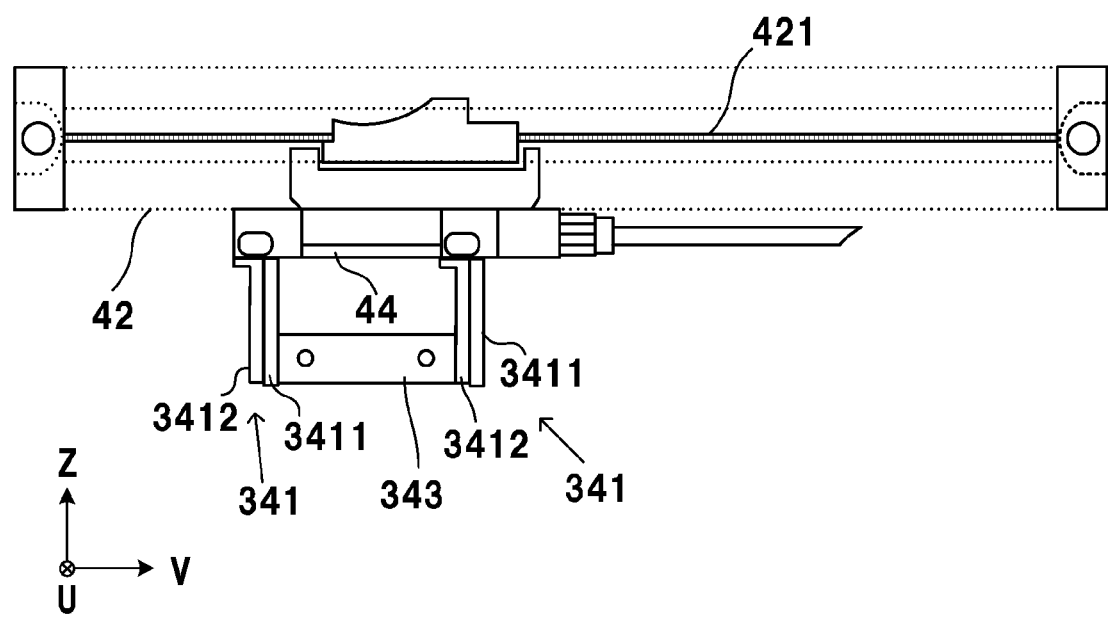
FIG. 11 is a schematic side view showing a case where an adjustment block 341 is attached to a position detector 44 in the above embodiment.

FIG. 11 is a schematic side view showing a case where an adjustment block 341 is attached to the position detector 44 in the above embodiment.

In the sensor unit 4 of the above embodiment, the adjustment block 41 is provided at both ends of the measurement scale 421. However, a sensor unit 34 may also be used in which the adjustment block 341 is provided at both ends of the position detector 44 (see FIG. 11). In this case, the arrangement is opposite that of a case where a first block 3411 and a second block 3412 made of different materials are fixed to the measurement scale 421. Specifically, the first block 3411 is fixed to the back surface side of the second block 3412.

For example, when the machine temperature of the wire electric discharge machine 100 rises, the front surface side of the V-axis slider 52 is displaced in the negative direction of the V-axis. Since the adjustment block 341 is curved in the positive direction of the V-axis when the temperature rises, the position detector 44 accordingly moves in the positive direction of the V-axis. When the machine temperature of the wire electric discharge machine 100 falls, the front surface side of the V-axis slider 52 is displaced in the positive direction of the V-axis. When the temperature falls, the adjustment block 341 is curved in the negative direction of the V-axis, and the position detector 44 accordingly moves in the negative direction of the V-axis.

In this way, even if the adjustment block 341 is attached to the position detector 44, a position misalignment due to thermal displacement is able to be corrected.

Here, the fixation of the adjustment block 341 to the column 2 may be performed by attachment via a fixing member 343, or by direct attachment without the fixing member 343.

In the present embodiment, a description has been given of the embodiment in which the sensor unit 4 including the adjustment block 41 is provided on the V-axis slider 52. However, the disclosure is not limited to this embodiment, and is applicable to an axis drive part that detects a linear movement position in an axial direction using a linear encoder or the like and performs driving in the axial direction, and also applicable to a die-sinking electric discharge machine.

In addition, among known linear encoders, there is also one formed in which the fixing member 43 is integrally formed on an upper part of the housing 42 housing the measurement scale 421, so that the fixing member 43 is fixed to the axis drive part 5 in a central position in an extension direction. In the case of using a linear encoder having such a shape, by fixing the adjustment blocks 41, 41 to the axis drive part 5 instead of providing the adjustment blocks 41, 41 at both ends of the housing 42 and fixing the fixing member 43 to the axis drive part 5, the same effects can be obtained.

Furthermore, in the present embodiment, the vertical arm 61 is configured to be moved in the U-axis, V-axis, Y-axis, and Z-axis directions, and the table is configured to be moved in the X-axis direction. However, the table may also be configured to be moved in the Y-axis and X-axis directions.

In the present embodiment, the U-axis slider 51 is provided between the Z-axis slider 93 and the vertical arm 61, and the vertical arm 61 is configured to be reciprocated in the U-axis direction by the U-axis slider 51. However, a U-axis saddle may be provided on the column 2 and may be configured to move in the U-axis direction.

The disclosure described above may be carried out in various forms without departing from the spirit and essential characteristics of the disclosure. Therefore, the embodiments described herein are exemplary and the disclosure should not be construed as being limited thereto.

What is claimed is:

1. An electric discharge machine, comprising:
   an axis drive part, configured to move a tool electrode in at least one axial direction; and
   a sensor unit, configured to detect a linear movement position of the axis drive part in the at least one axial direction,
   wherein the sensor unit comprises:
      a measurement scale, having a linear shape;
      a position detector, configured to scan the measurement scale and obtain position information; and
      a pair of adjustment blocks, being fixed to both ends of the measurement scale or the position detector and erected perpendicular to an extension direction of the measurement scale,
   wherein each of the pair of adjustment blocks comprises a first block and a second block made of different materials, being joined with each other through a fastening surface, and
   wherein each of the pair of adjustment blocks is fixed to the axis drive part and is curved in the at least one axial direction due to a temperature change,
   wherein an internal stress is generated in the fastening surface due to a difference in coefficient of thermal expansion between the first block and the second block, and the adjustment block is curved due to a bimetal effect.

2. The electric discharge machine according to claim 1, wherein the axis drive part comprises:
   a base; and
   a moving body, being disposed to face the base and reciprocating in the at least one axial direction,
   wherein the measurement scale and the position detector are disposed to face each other with one fixed to the base and the other fixed to the moving body.

3. The electric discharge machine according to claim 1, wherein
   the first block is made of ceramics, and
   the second block is made of a material having substantially the same coefficient of linear expansion as that of the axis drive part.

4. The electric discharge machine according to claim 1, wherein each of the pair of adjustment blocks comprises:
   a groove; and
   a wide part, having a width greater than a width of the groove.

5. A sensor unit, comprising:
   a measurement scale, having a linear shape;
   a position detector, configured to scan the measurement scale and detect a linear movement position of an object to be measured in at least one axial direction; and
   a pair of adjustment blocks, being fixed to both ends of the measurement scale or the position detector and erected perpendicular to an extension direction of the measurement scale,
   wherein each of the pair of adjustment blocks comprises a first block and a second block made of different materials, being joined with each other through a fastening surface, and
   wherein each of the pair of adjustment blocks is fixed to the object to be measured and is curved in the at least one axial direction due to a temperature change,
   wherein an internal stress is generated in the fastening surface due to a difference in coefficient of thermal expansion between the first block and the second block, and each of the pair of adjustment blocks is curved due to a bimetal effect.

* * * * *